United States Patent [19]

Passariello

[11] Patent Number: 5,266,539
[45] Date of Patent: Nov. 30, 1993

[54] PROCESS FOR THE DEFERRIZATION OF KAOLIN, QUARTZOSE SAND, PAPER FILLER, WHITE PIGMENT, PUMICE AND ELECTRONICS MATERIALS

[75] Inventor: Bruno Passariello, Tivoli, Italy

[73] Assignee: Consiglio Nazionale delle Ricerche, Rome, Italy

[21] Appl. No.: 942,340

[22] Filed: Sep. 9, 1992

Related U.S. Application Data

[63] Continuation of Ser. No. 702,294, May 20, 1991, abandoned.

[51] Int. Cl.5 .................... C04B 33/02; C04B 33/04; C04B 33/10
[52] U.S. Cl. .................... 501/149; 501/141; 501/145; 501/146; 501/148; 106/488
[58] Field of Search ................ 423/430; 501/141, 145, 501/146, 148, 149; 106/488

[56] References Cited

U.S. PATENT DOCUMENTS

| | | | |
|---|---|---|---|
| 3,892,587 | 7/1975 | Abercrombie, Jr. | 501/148 |
| 3,914,385 | 10/1975 | Slade | 423/430 |
| 4,075,030 | 2/1978 | Bundy et al. | 106/416 |
| 4,356,058 | 10/1982 | Fischer et al. | 162/76 |
| 4,618,374 | 10/1986 | Thompson, III et al. | 501/149 |
| 4,828,743 | 5/1989 | Rahfield et al. | 252/87 |
| 4,871,423 | 10/1989 | Grimsley et al. | 162/76 |

*Primary Examiner*—Mark L. Bell
*Assistant Examiner*—Michael Marcheschi
*Attorney, Agent, or Firm*—Oliff & Berridge

[57] ABSTRACT

The present invention relates to a process for selectively purifying ceramic materials for glass, paper and electronics use contaminated with iron compounds, the process using ascorbic acid or its derivatives as the iron reducing agent.

10 Claims, No Drawings

PROCESS FOR THE DEFERRIZATION OF KAOLIN, QUARTZOSE SAND, PAPER FILLER, WHITE PIGMENT, PUMICE AND ELECTRONICS MATERIALS

This is a continuation of application Ser. No. 07/702,294 filed May 20, 1991, now abandoned.

STATE OF THE ART

After undergoing other purification processes, materials for ceramics, glass, paper and electronics use are finally bleached by eliminating iron compounds by a process of classical reduction with sodium hydrosulphite ($Na_2S_2O_4$) in a sulphuric medium (pH<3).

By this method the iron is dissolved in the form of $FeSO_4$, which is then removed by filtration under pressure (see in this respect FR-A-2030730; U.S. Pat. No. 3,528,769; RO-A-49334; SU-A-485093; SU-A-628087; "Formation of aggressive substances in East German kaolins", Silikattechnik (81) p. 262-5, Vol. 32, No. 9).

However with these processes in most cases it is not possible to obtain high-quality products (for example the degree of whiteness obtainable in a kaolin by these methods is about 85-88%).

This is because the hydrosulphite is unable to reduce all the iron, which is present in the form of various chemical compositions.

With the treatment according to the present invention, using ascorbic, oxalic, citric or tannic acid in the presence of $H_2SO_4$ (pH<3), it is possible to reduce the iron present in its various compounds by making it totally soluble and hence removable by washing. In this manner a degree of whiteness of 89-94% is obtained, this representing a considerable improvement over the results obtained by traditional methods.

DETAILED DESCRIPTION OF THE INVENTION

The mineral, such as kaolin, quartzose sand, or pumice, is suspended in water and the ascorbic acid or its derivatives is suspended in this suspension in a quantity of between 0.1% and 5%. The suspension pH is then adjusted to below 3 (preferably between 2 and 3) with $H_2SO_4$.

The suspension is heated to a temperature of 65°-85° C. for 1-3 hours under stirring. The deferrized product is then collected by filtration, washed with water and dried.

The tests for determining the degree of whiteness were carried out by firing the sample in a Seger No. 8 cone and determining the whiteness index with a Photovolt Reflection Meter 670, using a green filter ($\lambda=550$ μm). Two buttons of each sample were obtained by casting in plaster moulds.

The chemical, mineralogical and morphological characteristics of the kaolin and quartzose sand used in the subsequently described examples are given below.

KAOLIN
Degree of whiteness: 85%

| Average chemical analysis | | Average particle size distribution | |
| --- | --- | --- | --- |
| STANDARD L.O.I. | | ISO 565 microns | Cumulative residue |
| (LOSS OF IGNITION) | 8.5 + 0.1 | | |
| $SiO_2$ | 64.7 + 0.8 | 60 | 1% |
| $Al_2O_3$ | 24.5 + 0.2 | 30 | 5% |
| $Fe_2O_3$ | 0.8 + 0.1 | 10 | 22% |
| $TiO_2$ | 0.34 + 0.05 | 5 | 40% |
| CaO | 0.08 + 0.02 | 2 | 75% |
| $K_2O$ | 0.65 + 0.05 | | |
| $Na_2O$ | 0.14 + 0.05 | | |
| MgO | 0.1 + 0.03 | | |

Rational analysis

| | |
| --- | --- |
| Kaolinite | 60 |
| Quartz | 33 |
| Vitreous substances | 7 |

| Moisture | Raw shrinkage | Whiteness |
| --- | --- | --- |
| 15% | 4.6% | 85% |
| Flexural strength | Shrinkage on firing | Porosity |
| 20.2 kg/cm$^2$ | 9.2% | 27.9% |

QUARTZOSE SAND
Sample separated by treating kaolin exceedng 71 μm
Degree of whiteness: 44%
Chemical analysis

| | |
| --- | --- |
| $Al_2O_3$ | 5.09% |
| P.C. | 3.04% |
| $SiO_2$ | 88.31% |
| $Fe_2O_3$ | 0.81% |

EXAMPLE 1

100 g of kaolin are made up to 400 cc with water, 4 g of ascorbic acid are added and the pH adjusted to 2.5 with $H_2SO_4$. The suspension is heated to 72° C. and left stirring for 2 h. The residue is filtered off and washed with hot water.

(Degree of whiteness after firing 91.5%).

EXAMPLE 2

100 g of kaolin are made up to 300 cc with water, 4 g of ascorbic acid are added and the pH adjusted to 2.5 with $H_2SO_4$. The suspension is heated to 72° C. and left stirring for 1 h. The residue is filtered off and washed with hot water.

(Degree of whiteness after firing 919).

EXAMPLE 3

100 g of kaolin are made up to 300 cc with the solution of the preceding test, and the pH adjusted to 2.3 with $H_2SO_4$. The suspension is heated to 72° C. and left stirring for 2 h. The residue is filtered off and washed with hot water.

(Degree of whiteness after firing 89%).

EXAMPLE 4

100 g of kaolin are made up to 300 cc with water, 4 g of ascorbic acid are added and the pH adjusted to 2.5 with $H_2SO_4$. The suspension is heated to 72° C. and left stirring for 3 h. A further 1 g of ascorbic acid is added, the pH readjusted to 2.5 with sulphuric acid the suspension left stirring for 1 h. The residue is filtered off and washed with hot water.

(Degree of whiteness after firing 93.5%).

EXAMPLE 5

100 g of kaolin are made up to 300 cc with water, 0.5 g of ascorbic acid are added and the pH adjusted to 2.5 with $H_2SO_4$. The suspension is heated to 85° C. and left stirring for 2 h. The residue is filtered off and washed with hot water.

(Degree of whiteness after firing 919).

EXAMPLE 6

100 g of kaolin are made up to 300 cc with water, 0.12 g of ascorbic acid are added and the pH adjusted to 2.5 with $H_2SO_4$. The suspension is heated to 85° C. and left stirring for 3 h. The residue is filtered off and washed with hot water.

(Degree of whiteness after firing 90.5%).

EXAMPLE 7

100 g of kaolin are made up to 300 cc with water, 0.5 g of ascorbic acid are added and the pH adjusted to 2.5 with $H_2SO_4$. The suspension is heated to 80° C. and left stirring for 1 h. A further 0.5 g of ascorbic acid are added and the suspension again heated to 80° C. for 1 h. The residue is filtered off and washed with hot water.

(Degree of whiteness after firing 89%).

EXAMPLE 8

100 g of kaolin are made up to 300 cc with water, the pH is adjusted to 2.5 with $H_2SO_4$ and the suspension left stirring for 3 h. 0.5 g of ascorbic acid are added and the suspension heated to 80° C. for 1 h, a further 0.5 g of ascorbic acid are added and the suspension again heated to 80° C. for 1 h under stirring. The residue is filtered off and washed with hot water.

(Degree of whiteness after firing 93.5%).

EXAMPLE 9

100 g of quartzose sand are made up to 300 cc with water, 4 g of ascorbic acid are added to the suspension and the pH is adjusted to 2.3 with sulphuric acid. The suspension is heated to 60° C. and left stirring for 2 h. The residue is filtered off and washed with hot water.

(Degree of whiteness after firing 54%).

EXAMPLE 10

100 g of quartzose sand are made up to 300 cc with water, 4 g of oxalic acid are added to the suspension and the pH is adjusted to 2.3 with sulphuric acid. The suspension is heated to 60° C. and left stirring for 2 h. The residue is filtered off and washed with hot water.

(Degree of whiteness after firing 52%).

EXAMPLE 11

100 g of kaolin are made up to 300 cc with water, 1 g of $K_2S_2O_7$ are added to the suspension and the pH is adjusted to 2.3 with sulphuric acid. The suspension is heated to 75° C. under stirring for 2 h. 1 g of ascorbic acid are now added and the system left stirring for 1 h. The residue is filtered off and washed with hot water.

(Degree of whiteness after firing 89%).

EXAMPLE 12

100 g of mineral are made up to 300 cc with water, 4 g of oxalic acid are added to the suspension and the pH is adjusted to 2.4 with sulphuric acid. The suspension is heated to 80° C. and left stirring for 2 h. The residue is filtered off and washed with hot water.

(Degree of whiteness after firing 929).

EXAMPLE 13

100 g of mineral are made up to 300 cc with water, 4 g of citric acid are added to the suspension and the pH is adjusted to 2.5 with sulphuric acid. The suspension is heated to 80° C. and left stirring for 2 h. The residue is filtered off and washed with hot water.

(Degree of whiteness after firing 89%).

EXAMPLE 14

100 g of mineral are made up to 300 cc with water, 4 g of tannic acid are added to the suspension and the pH is adjusted to 2.3 with sulphuric acid. The suspension is heated to 80° C. and left stirring for 2 h. The residue is filtered off and washed with hot water.

(Degree of whiteness after firing 89%).

I claim:

1. A process for bleaching a material selected from the group consisting of kaolin, quartzose sand, and pumice consisting of:
    a) suspending said material in water, and adding a carboxylic acid selected from the group consisting of ascorbic, oxalic, citric and tannic acid, adjusting the pH to below 3 with sulfuric acid;
    b) stirring under heat the suspension obtained in the preceding step; and
    c) collecting the precipitate by filtration.

2. A process as claimed in claim 1, wherein ascorbic acid is used.

3. A process as claimed in claim 1, wherein oxalic acid is used.

4. A process as claimed in claim 1, wherein citric acid is used.

5. A process as claimed in claim 1, wherein tannic acid is used.

6. A process as claimed in claim 1, wherein said carboxylic acid represents 0.1-5% by weight of the material treated.

7. A process as claimed in claim 4, wherein the suspension is acidified with sulphuric acid to a pH of between 2 to 3.

8. A process as claimed in claim 5, wherein the temperature at which the suspension is stirred is 65°-85° C.

9. A process as claimed in claim 6, wherein the stirring time is 1-3 hours.

10. The process of claim 1, wherein said kaolin, quartzose sand, and pumice, are deferrized by said process.

* * * * *